United States Patent
Rajzer et al.

(10) Patent No.: US 12,095,255 B2
(45) Date of Patent: Sep. 17, 2024

(54) OVERCURRENT PROTECTION FOR ELECTRIC MOTOR

(71) Applicant: Snap-on Incorporated, Kenosha, WI (US)

(72) Inventors: Michael T. Rajzer, Kenosha, WI (US); Jason Genz, Kenosha, WI (US); Christoffer S. Fox, Kenosha, WI (US)

(73) Assignee: Snap-on Incorporated, Kenosha, WI (US)

( * ) Notice: Subject to any disclaimer, the term of this patent is extended or adjusted under 35 U.S.C. 154(b) by 136 days.

(21) Appl. No.: 17/694,242

(22) Filed: Mar. 14, 2022

(65) Prior Publication Data

US 2022/0311237 A1 Sep. 29, 2022

Related U.S. Application Data

(60) Provisional application No. 63/164,860, filed on Mar. 23, 2021.

(51) Int. Cl.
*H02H 7/08* (2006.01)
*B25B 21/00* (2006.01)

(52) U.S. Cl.
CPC ......... *H02H 7/0844* (2013.01); *B25B 21/004* (2013.01)

(58) Field of Classification Search
CPC ............................ H02H 7/0844; B25B 21/004
See application file for complete search history.

(56) References Cited

U.S. PATENT DOCUMENTS

| | | |
|---|---|---|
| 4,513,342 A | 4/1985 | Rocha |
| 4,752,852 A | 6/1988 | Ahl et al. |

(Continued)

FOREIGN PATENT DOCUMENTS

| | | |
|---|---|---|
| CN | 212183113 U | 12/2020 |
| CN | 212751779 U | 3/2021 |

(Continued)

OTHER PUBLICATIONS

Canadian Office Action for corresponding CA Application No. 3,152,994, dated May 15, 2023, 4 pages.

(Continued)

*Primary Examiner* — Zoheb S Imtiaz
(74) *Attorney, Agent, or Firm* — Taft Stettinius & Hollister LLP

(57) ABSTRACT

Overcurrent protection of an electrically powered, motorized device, such as a power tool, wherein the tool includes a tool housing, an output assembly, a trigger, an electrical safety device, a motor, an indicator, a controller, and a power source. The electrical safety device, for example a fuse, is disposed in series with a power connection from the power source to the controller. The controller measures current passing through the electrical safety device in time intervals when the trigger is actuated. The controller determines accumulated thermal energy passing through the electrical safety device, and compares the accumulated thermal energy to a threshold. If the accumulated thermal energy exceeds the threshold, the controller ceases or discontinues to allow power to be provided to the motor from the power source, thereby shutting off the motor. The controller may also activate the indicator to indicate a fault to the user.

20 Claims, 4 Drawing Sheets

(56) References Cited

U.S. PATENT DOCUMENTS

| | | | |
|---|---|---|---|
| 4,962,439 A | 10/1990 | Nutz | |
| 5,220,478 A | 6/1993 | Innes | |
| 5,381,296 A | 1/1995 | Ekelund et al. | |
| 5,761,018 A * | 6/1998 | Blakely | H02H 3/083 361/103 |
| 5,892,351 A | 4/1999 | Faulk | |
| 6,170,241 B1 | 1/2001 | Shibilski et al. | |
| 6,296,065 B1 * | 10/2001 | Carrier | H02J 7/0044 173/171 |
| 6,469,473 B1 | 10/2002 | Schlicht et al. | |
| 7,276,878 B2 | 10/2007 | Phillips et al. | |
| 7,436,643 B2 | 10/2008 | van den Berg et al. | |
| 7,728,553 B2 | 6/2010 | Carrier et al. | |
| 7,969,177 B2 | 6/2011 | Perkins et al. | |
| 8,405,945 B2 | 3/2013 | DiMarco et al. | |
| 8,476,853 B2 * | 7/2013 | Vanko | H02H 3/247 318/494 |
| 8,587,912 B2 | 11/2013 | Jezierski et al. | |
| 8,762,083 B2 | 6/2014 | Rodseth et al. | |
| 9,193,055 B2 | 11/2015 | Lim et al. | |
| 9,314,908 B2 | 4/2016 | Tanimoto et al. | |
| 9,819,290 B2 | 11/2017 | Ma et al. | |
| 9,874,600 B2 | 1/2018 | Yehle et al. | |
| 9,950,417 B2 | 4/2018 | Ito et al. | |
| 10,554,040 B2 | 2/2020 | Meng et al. | |
| 10,714,923 B2 | 7/2020 | O'Sullivan et al. | |
| 10,770,993 B2 | 9/2020 | Chen et al. | |
| 2006/0119318 A1 * | 6/2006 | Serdynski | B25F 1/00 320/114 |
| 2007/0103833 A1 * | 5/2007 | Harris, IV | H02H 3/445 361/103 |
| 2008/0043393 A1 * | 2/2008 | Petkov | H02H 5/041 361/103 |
| 2010/0328828 A1 | 12/2010 | Xu | |
| 2011/0026177 A1 | 2/2011 | Atluri et al. | |
| 2012/0022808 A1 | 1/2012 | Liebenow | |
| 2013/0082627 A1 * | 4/2013 | Ichikawa | H02P 6/00 318/139 |
| 2013/0098646 A1 | 4/2013 | Funabashi et al. | |
| 2019/0074145 A1 | 3/2019 | Delacruz | |
| 2021/0044130 A1 | 2/2021 | Burger et al. | |
| 2022/0193867 A1 * | 6/2022 | Hanamura | B25B 23/1475 |

FOREIGN PATENT DOCUMENTS

| | | |
|---|---|---|
| GB | 2271895 A | 4/1994 |
| JP | H0993795 A | 4/1997 |
| TW | 200740566 A | 11/2007 |
| TW | 200812183 A | 3/2008 |

OTHER PUBLICATIONS

Taiwan Office Action for corresponding Application No. 11220018400 dated Jan. 9, 2023, 9 pages.

Combined Search and Examination Report for corresponding Application No. GB2203892.1 dated Aug. 24, 2022, 7 pages.

Taiwan Office Action for corresponding Application No. 111110666 dated Sep. 18, 2023, 4 pages.

* cited by examiner

OVERCURRENT PROTECTION FOR ELECTRIC MOTOR

CROSS REFERENCES TO RELATED APPLICATIONS

This application claims the benefit of U.S. Provisional Patent Application Ser. No. 63/164,860, filed Mar. 23, 2021, the contents of which are incorporated herein by reference in their entirety.

TECHNICAL FIELD OF THE INVENTION

The present invention relates to electric motors, and more particularly to overcurrent protection of electrical components used with operation of an electric motor.

BACKGROUND OF THE INVENTION

Power hand tools, such as, for example, motorized ratchet wrenches, impact wrenches, and other drivers, are commonly used in automotive, industrial, and household applications to install and remove threaded fasteners and apply a torque and/or angular displacement to a work piece, such as a threaded fastener, for example. Power hand tools generally include an output member (such as a drive lug or chuck), a trigger switch that is actuatable by a user, an electric motor contained in a housing, and other components, such as switches, light emitting diodes (LEDs), controller(s), and a power source, such as a battery, for example.

Some power hand tools use a fuse in series with a power connection from the power source to the controller with the intent that the fuse opens in the event of a failure, such as, for example, a short circuit condition, to protect electrical components, such as the controller, motor, and/or trigger switch, from damage from overcurrent. However, the fuse can be difficult to size properly, especially for high-current tools, so that it opens quickly in the event of a failure, such as, for example, a short circuit condition, and also allows the tool to operate continuously during normal operation. This results in using fuses that are undersized or oversized (i.e., the $I^2t$ rating of the fuse is too low or too high). The $I^2t$ ratings are provided in data sheets for each fuse family. An undersized fuse can result in operation interruptions that are not necessary to protect the electrical components, and an oversized fuse can result in allowing prolonged high currents to flow through the electrical components in the event of a failure, thereby causing more damage.

SUMMARY OF THE INVENTION

The present invention relates broadly to overcurrent protection of an electrically operated motor device, such as a power tool. The tool includes a tool housing, an output assembly (such as a ratchet head assembly) adapted to provide torque to a work piece, a trigger switch, a motor housed in the housing, an indicator, a controller, and a power source. An electrical safety device, such as for example, a fuse, is disposed in series with a power connection from the power source to the controller. The controller measures current passing through the fuse in time intervals when the trigger is actuated. The controller determines accumulated thermal energy of the electrical safety device by repeatedly using the formula current×current×time ($I^2 \times t$) at every time interval. The controller compares the accumulated thermal energy to a threshold. If the accumulated thermal energy exceeds a threshold, the controller ceases or discontinues to allow power to be provided to the motor from the power source, thereby shutting off the motor. The controller may also activate the indicator to indicate a fault to the user.

The present invention uses a controller to limit thermal energy passing through the electrical safety device, such as for example, a fuse, instead of relying exclusively on the electrical safety device to be sized properly to protect the electrical component of the tool in the event of a tool failure, such as, for example, a short circuit. The present invention prevents the electrical safety device from stopping or interrupting current from a power source prematurely and/or unnecessarily, while also allowing the electrical safety device to act quickly in the event of failure. Moreover, the present invention allows for a slightly undersized conventional electrical safety device to be used successfully without having to upgrade to a larger electrical safety device with a higher rating (such as a higher $I^2t$ rating).

BRIEF DESCRIPTION OF THE DRAWINGS

For the purpose of facilitating an understanding of the subject matter sought to be protected, there is illustrated in the accompanying drawing embodiments thereof, from an inspection of which, when considered in connection with the following description, the subject matter sought to be protected, its construction and operation, and many of its advantages, should be readily understood and appreciated.

DETAILED DESCRIPTION

Figure 1:
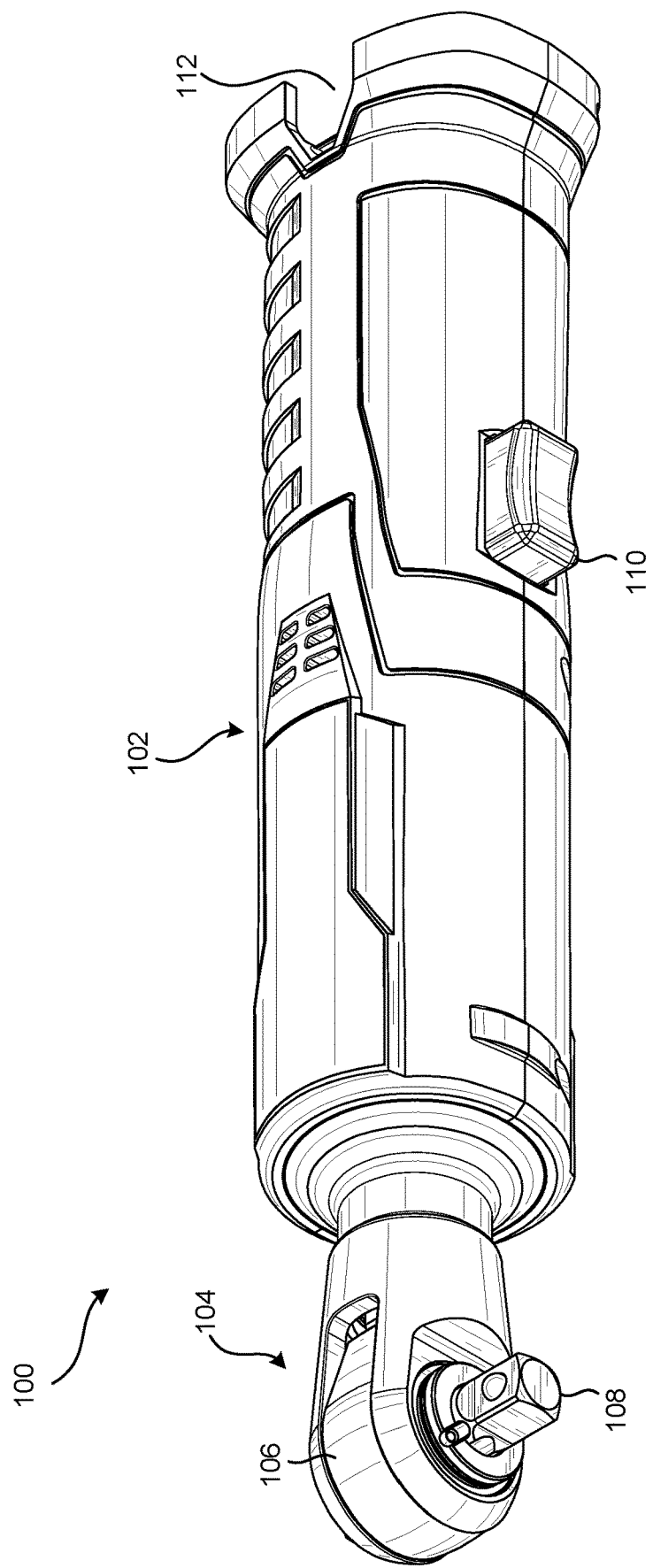
FIG. 1 is perspective view of an exemplar tool incorporating an embodiment of the present invention.

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present invention relates broadly to overcurrent protection of an electrically motorized device, such as a power tool. The tool includes a tool housing, an output assembly (such as a ratchet head assembly) adapted to provide torque to a work piece, a trigger switch, an electrical safety device, a motor housed in the housing, an indicator, a controller, and a power source, such as, for example, a battery. The electrical safety device, such as for example, a fuse, is disposed in series with a power connection from the power source to the controller. The controller measures current passing through the electrical safety device in time intervals when the trigger is actuated. The controller determines accumulated thermal energy passing through the electrical safety device by repeatedly using the formula current*current*time ($I^2 * t$) at every time interval. The controller compares the accumulated thermal energy to a threshold. If the accumulated thermal energy exceeds the threshold, the controller ceases or discontinues to allow power to be provided to the motor from the power source, thereby shutting off the motor. The controller may also activate the indicator to indicate a fault to the user.

By using a controller to limit thermal energy passing through a conventional electrical safety device, such as for example, a fuse, the precise sizing of the electrical safety device is not solely relied upon, like existing solutions, to protect the electrical components of the tool in the event of a tool failure, such as, for example, a short circuit. The present invention allows the electrical safety device to quickly act in the event of a tool failure without stopping or interrupting the current from the power source prematurely and/or unnecessarily. Moreover, the present invention allows for a slightly undersized conventional electrical safety device (e.g., a fuse) to be used without having to upgrade to a larger electrical safety device with a higher rating.

Figure 2:
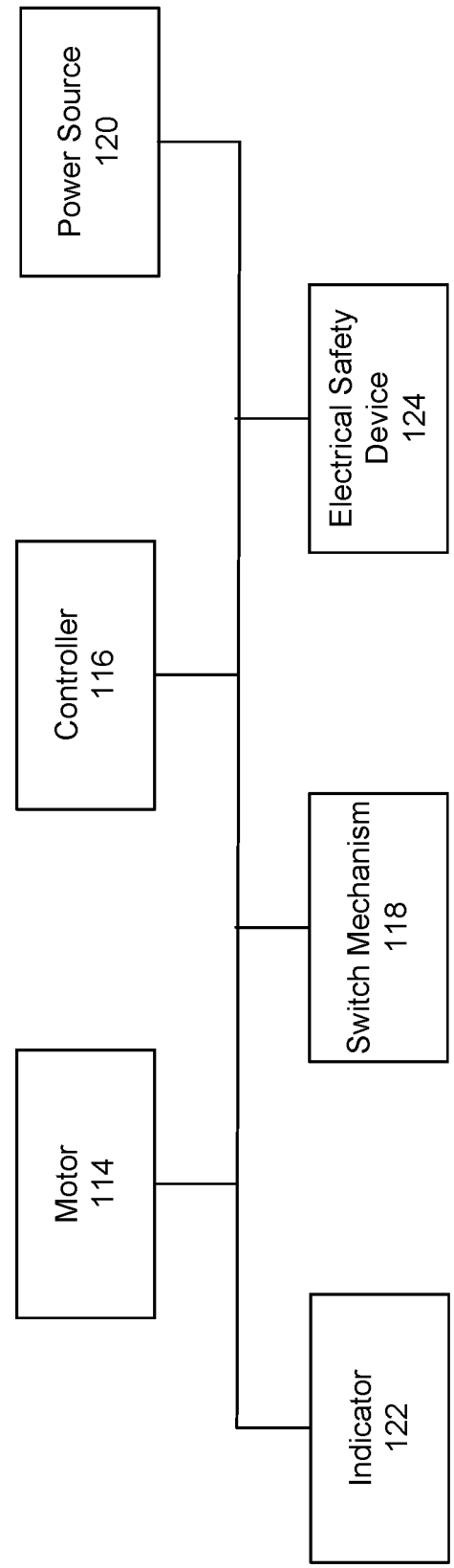
FIGS. 2 and 3 are block component diagrams of electronic components of an exemplar tool incorporating an embodiments of the present invention.
Figure 3:
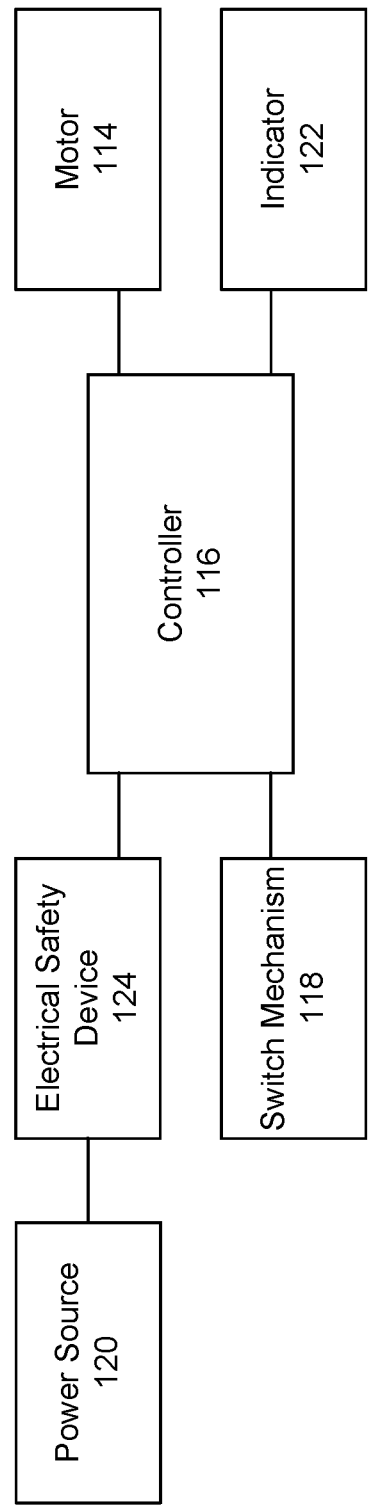

Referring to FIGS. 1-3, an exemplar tool 100 incorporating an embodiment of the present invention, such as a cordless ratchet-type tool, includes a main tool housing 102 and output assembly 104 (such as a ratchet head assembly). The tool housing 102 may include first and second housing portions that are coupled together in a clamshell type manner and securely coupled to the output assembly 104. The tool housing 102 may enclose or house an electric motor 114 (shown in FIGS. 2 and 3), controller 116 (shown in FIGS. 2 and 3), a switch assembly 118 (shown in FIGS. 2 and 3), display with buttons for configuring and setting the tool, one or more indicators 122 (shown in FIGS. 2 and 3), such as, for example, light emitting diodes, an electrical safety device 124 (shown in FIGS. 2 and 3), such as, for example, a fuse, and other components for operation of the tool. The tool housing 102 may also include a textured or knurled grip to improve a user's grasp of the tool 100 during use.

The output assembly 104 includes a drive portion 106 including a drive lug 108, for example. The drive lug 108 is adapted to apply torque to a work piece, such as a fastener, via an adapter, bit, or socket coupled to the drive lug 108, such as a bi-directional ratcheting square or hexagonal drive. As illustrated, the drive lug 108 is a "male" connector designed to fit into or matingly engage a female counterpart. However, the drive portion 106 may alternatively include a "female" connector designed to matingly engage a male counterpart. The drive portion 106 may also be structured to directly engage a work piece without requiring coupling to an adapter, bit, or socket. The rotational direction of the drive portion 106/drive lug 108 can be selected by rotation of a selector switch to be either a first or second rotational direction (such as, clockwise or counterclockwise).

The tool 100 also includes a trigger 110 that can be actuated by a user to cause the tool 100 to operate. For example, the user can depress the trigger 110 inwardly to selectively cause power to be drawn from a power source 120 and cause a motor 114 to provide torque to the output assembly 104 and cause the drive lug 108 to rotate in a desired rotational direction. The trigger 110 may also be operably coupled to a switch mechanism 118 that is adapted to cause power to be supplied from the power source 120 to the motor 114 when the trigger 110 is actuated. Any suitable trigger 110 or switch can be implemented without departing from the spirit and scope of the present invention. For example, the trigger 110 may also be biased such that the trigger 110 is inwardly depressible, relative to the tool 100, to cause the tool 100 to operate, and a release of the trigger 110 causes the trigger 110 to move outwardly, relative to the tool 100, to cease operation of the tool 100 via the biased nature of the trigger 110. The trigger 110 and switch mechanism 118 may also be a variable speed type mechanism. In this regard, actuation or depression of the trigger 110 causes the motor to operate at a faster speed the further the trigger 110 is depressed.

The motor 114 may be disposed in the tool housing 102 and be adapted to operably engage the output assembly 104, and provide torque to the tool 100 and, in turn, to the drive portion 106/drive lug 108. The motor 114 may be a brushless or brushed type motor, or any other suitable motor. A power source 120 can be associated with the tool 100 to provide electric power for the tool 100 to operate the motor. In an embodiment, the power source 120 can be housed in an end 112 of the tool housing 102, opposite the output assembly 104, a midsection of the tool 100, or any other portion of the tool 100/tool housing 102. The power source 120 may also be an external component that is not housed by the tool 100, but that is operatively coupled to the tool 100 through, for example, wired or wireless means. In an embodiment, the power source 120 is a removable and rechargeable battery that is adapted to be disposed in the end of the tool housing 102 and electrically couple to corresponding terminals of the tool 100.

The controller 116 may be operably coupled to one or more of the power source, 120, switch mechanism 118, and the motor 114. The controller 116 may include a central processing unit (CPU) for processing data and computer-readable instructions, and a memory for storing data and instructions. The memory may include volatile random access memory (RAM), non-volatile read only memory (ROM), and/or other types of memory. A data storage component may also be included, for storing data and controller/processor-executable instructions (for example, instructions for the operation and functioning of the tool 100). The data storage component may include one-or-more types of non-volatile solid-state storage, such as flash memory, read-only memory (ROM), magnetoresistive RAM (MRAM), ferroelectric RAM (FRAM), phase-change memory, etc.

Computer instructions for operating the tool 100 and its various components may be executed by the controller 116, using the memory as temporary "working" storage at runtime. The computer instructions may be stored in a non-transitory manner in non-volatile memory, storage, or an external device. Alternatively, some of the executable instructions may be embedded in hardware or firmware in addition to or instead of in software.

The electrical safety device 124, such as for example, a fuse, is disposed in series with a power connection from the power source 120 to the controller 116 to provide overcurrent protection to the controller 116, the motor 114, and/or other electrical components of the tool 100. When too much current flows through the electrical safety device 124 due to a failure event, such as, for example, a short circuit condition, the electrical safety device 124 stops or interrupts electrical current, thereby shutting off the motor 114 and protecting other components. Once the electrical safety device 124 has operated it is an open circuit and must be replaced or rewired.

For example, the controller 116 may implement the methods described herein. When the trigger 110 is actuated, power is provided to the motor 114 to cause the output assembly 104 to operate and overcurrent protection begins. During operation of the tool 100, the controller 116 measures current passing through the electrical safety device 124 in time intervals, such as, for example, every 1 microsecond or every 1 millisecond. A high-pass filter may be used to filter the current and/or accumulated thermal energy passing through the electrical safety device 124, for example, to remove slowly changing amounts of current and/or accumulated thermal energy. The controller 116 determines accumulated thermal energy passing through the electrical safety 124 device by repeatedly using the formula current×current×time ($I^2 \times t$) at every time interval. The controller 116 compares the accumulated thermal energy to a threshold. The threshold is based on the minimum number of $I^2 \times t$ pulses that the electrical safety device 124 is able to or should be able to withstand and the specifications provided by the manufacturer of the electrical safety device 124. If the accumulated thermal energy exceeds the threshold, the controller 116 ceases or discontinues to allow power to be provided to the motor 114 from the power source 120, thereby shutting off the motor 114, which prevents the electrical safety device 124 from stopping or interrupting current from the power source prematurely and/or unnecessarily. The tool 100 may also activate the indicator 122 to indicate a fault to the user. The indicator 122 may be any type of indicator, such as a light emitting diode (LED), haptic actuator, display, etc. that is capable of indicating the fault to the user. Further, the indicator may be deactivated after a predetermined amount of time.

Figure 4:
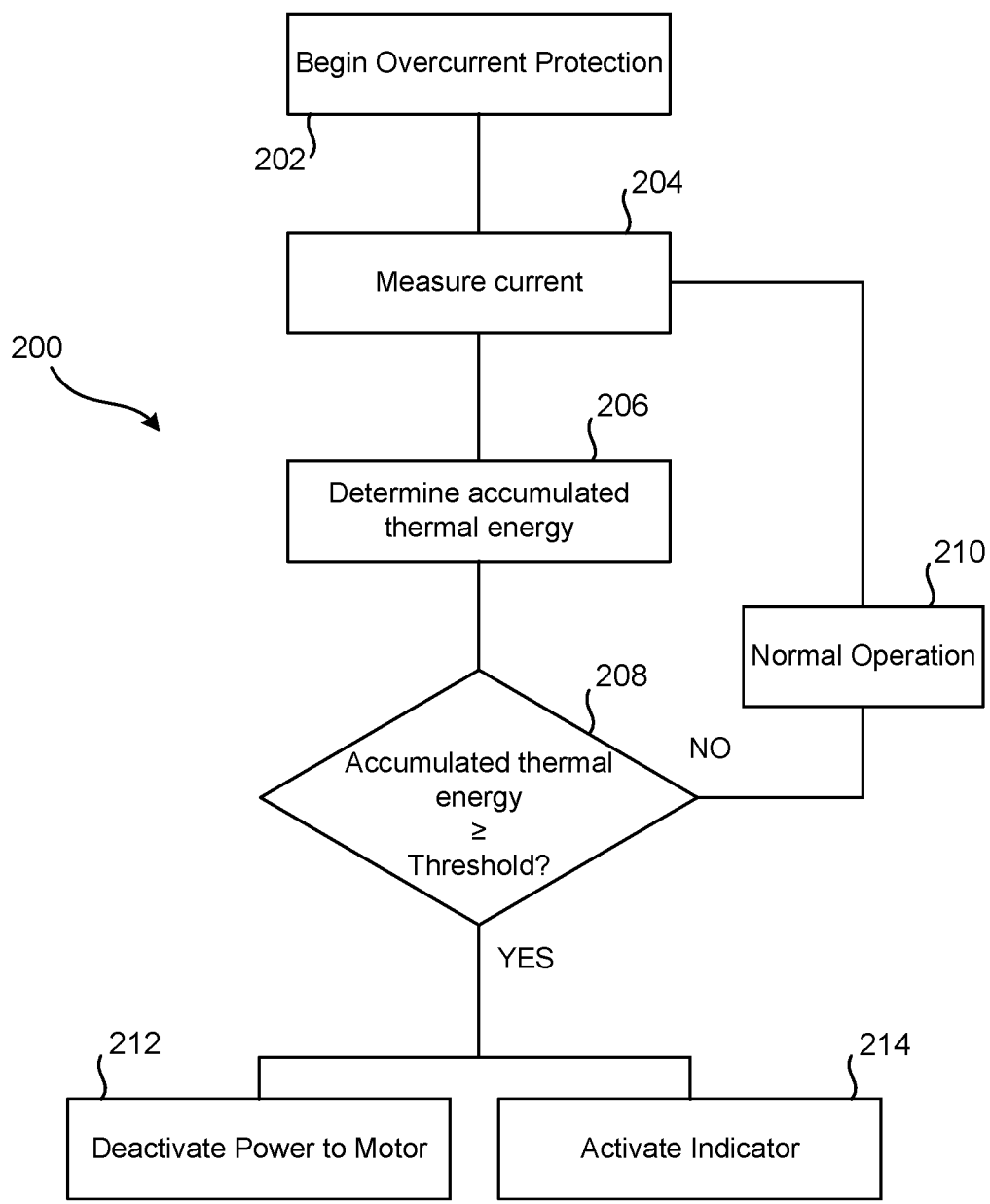
FIG. 4 is a block diagram of a method of operation of an exemplar tool incorporating an embodiment of the present invention.

Referring to FIG. 4, a method 200 of operation of an exemplar tool 100 incorporating an embodiment of the present invention is described. Overcurrent protection begins when the trigger is actuated, illustrated as block 202. Once the trigger is actuated, the tool (such as via controller 116) measures current passing through the electrical safety device 124 in time intervals, such as, for example, every 1 microsecond or every 1 millisecond, illustrated as block 204. The tool (such as via controller 116) determines accumulated thermal energy passing through the electrical safety 124 device, illustrated as block 206. As described above, the tool may filter the current and/or accumulated thermal energy using a high-pass filter, for example. The tool (such as via controller 116) compares the accumulated thermal energy (which may be the filtered accumulated thermal energy) to the threshold, illustrated as block 208. When the accumulated thermal energy is below the threshold, the tool (such as via controller 116) continues normal operation, illustrated as block 210, and continues to measure current every predetermined time interval and calculate the accumulated thermal energy until the trigger is released. When the accumulated thermal energy is equal to or exceeds the threshold, the tool (such as via controller 116) ceases or deactivates power supplied to the motor, illustrated as block 212, and may also activate the indicator, illustrated as block 214, until the trigger is released.

As discussed herein, the exemplar tool 100 that incorporates an embodiment of the present invention is a ratchet-type wrench. However, it will be appreciated that the present invention can be used with any type of hand-held motorized tool, including, without limitation, electrically powered or motorized tools, such as a drill, router, or impact wrench, ratchet wrench, screwdriver, or other powered tool, that is powered by electricity via an external power source (such as a wall outlet and/or generator outlet) or a battery. Also, while the present invention is described as being used with a tool, which is exemplar, the present invention can be used with or incorporated into any electrically operated motor devices.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object. As used herein, the term "a" or "one" may include one or more items unless specifically stated otherwise.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A method of operating a tool including a motor, an output assembly adapted to be driven by the motor, a power source adapted to supply power to the motor, and a controller operably coupled to the motor and the power source, the method comprising:
   determining an amount of accumulated thermal energy passing through an electrical safety device when a supply of power is being supplied to the motor, wherein the electrical safety device is operably coupled in series with a power connection from the power source to the controller;
   comparing the amount of accumulated thermal energy to a threshold limit; and
   causing the supply of power being supplied to the motor to stop when the accumulated thermal energy meets or exceeds the threshold limit.

2. The method of claim 1, further comprising respectively measuring amounts of current passing through the electrical safety device at predetermined time intervals.

3. The method of claim 2, wherein the step of determining the amount of accumulated thermal energy passing through the electrical safety device is based on the amounts of current passing through the electrical safety device respectively at the predetermined time intervals.

4. The method of claim 2, further comprising filtering the amounts of current through a filter of the tool.

5. The method of claim 4, wherein the filter is a high-pass filter.

6. The method of claim 1, further comprising filtering the amount of accumulated thermal energy through a filter of the tool.

7. The method of claim 6, wherein the filter is a high-pass filter.

8. The method of claim 1, further comprising allowing the supply of power to be supplied to the motor when the amount of accumulated thermal energy is below the threshold limit.

9. The method of claim 1, wherein the step of determining the amount of accumulated thermal energy passing through the electrical safety device is initiated when a trigger of the tool is actuated.

10. A tool having a motor, a power source adapted to supply power to the motor, and an output assembly adapted to be driven by the motor, the tool comprising:
   a controller operably coupled to the motor and the power source; and
   an electrical safety device operably coupled in series with a power connection from the power source to the controller;
   wherein the controller is adapted to:

determine an amount of accumulated thermal energy passing through the electrical safety device when a supply of power is being supplied to the motor;

compare the amount of accumulated thermal energy to a threshold limit; and cause the supply of power being supplied to the motor to stop when the amount of accumulated thermal energy meets or exceeds the threshold limit.

11. The tool of claim 10, wherein the controller is further adapted to respectively measure amounts of current passing through the electrical safety device at predetermined time intervals.

12. The tool of claim 11, wherein the controller is further adapted to determine the amount of accumulated thermal energy passing through the electrical safety device based on the amounts of current passing through the electrical safety device respectively at the predetermined time intervals.

13. The tool of claim 11, further comprising a filter adapted to filter the amounts of current.

14. The tool of claim 13, wherein the filter is a high-pass filter.

15. The tool of claim 10, further comprising a filter adapted to filter the amount of accumulated thermal energy.

16. The tool of claim 15 wherein the filter is a high-pass filter.

17. The tool of claim 10, wherein the controller is further adapted to allow the supply of power to be supplied to the motor when the amount of accumulated thermal energy is below the threshold limit.

18. The tool of claim 10, wherein the controller is further adapted to determine the amount of accumulated thermal energy passing through the electrical safety when a trigger of the tool is actuated.

19. The tool of claim 10, wherein the controller includes a data storage component adapted to store executable instructions.

20. The tool of claim 19, wherein data storage component is a ferroelectric random access memory (FRAM).

* * * * *